UNITED STATES PATENT OFFICE.

LOUIS BENUSSI AND CHARLES DONDERO, OF SAN FRANCISCO, CALIFORNIA.

PRESERVATIVE.

SPECIFICATION forming part of Letters Patent No. 440,257, dated November 11, 1890.

Application filed June 19, 1890. Serial No. 356,020. (No specimens.)

*To all whom it may concern:*

Be it known that we, LOUIS BENUSSI and CHARLES DONDERO, citizens of the United States, residing in the city and county of San Francisco, State of California, have jointly invented a new and useful Composition of Matter to be Used for Indefinitely Preserving Fresh Fish and Meat in their Natural Flavor and Freshness, of which the following is a specification.

Our composition consists of the following ingredients, combined in weight in the proportions stated, viz: pure water, 90.41; albumen or gelatine, 6.30; potassium sulphate, .02; sodium phosphate, .14; sodium chloride, 1.70; boracic acid or borate of sodium, .99; phosphate of iron, .07; phosphate of calcium, .07. The gelatine is to be dissolved in one half of the water at 145° Fahrenheit. The other ingredients are to be dissolved together in the remaining half of the water in another vessel at the same temperature. Both solutions are to be then mixed and thoroughly mingled by agitation until the temperature is reduced to or under 60°, when the compound is ready for use as a preservative of fresh fish and meat. The operation, from beginning to end, is to be conducted in closed vessels, particularly when the mixing, agitation, and reduction of temperature are taking place, in order to prevent the absorbing power of the compound to absorb obnoxious and deleterious gases from the air.

The preservative compound is employed or used as brines, &c., are used—that is, by submerging the food therein. The submersion is effected at any temperature between 60° and 45°. The food, particularly if fish, is to be at the time of submersion of the same temperature of the preservative compound. If the food is to be preserved for only a few weeks or months, the potassium sulphate, sodium phosphate, phosphate of iron, and phosphate of calcium may be entirely dispensed with. In either case the preservative compound is perfectly harmless, and when its gelatine is made of sound meat or fish, as beef-tea is commonly prepared, it may be safely used as food without inconveniencing the health of the consumer. It is not, however, intended for food, but only as a preservative in air-tight receptacles of fresh fish and meat destined to future use, transportation, or exportation.

To use the food is only necessary to wash or rinse it in cold or slightly-warm water, when the gelatinous compound surrounding it will instantly disappear.

By the use of the above composition fish and meat are preserved for months and years in their natural freshness and fragrance, ever retaining their primitive healthfulness and wholesome qualities, undergoing no detrimental alteration on account of high temperature, light, or atmospheric variations.

We are not aware that a composition consisting of albumen or gelatine, potassium sulphate, sodium phosphate, sodium chloride, boracic acid or borate of sodium, phosphate of iron, and phosphate of calcium has been used or is used in the United States or any foreign country for the purpose of preserving fresh fish and meat either in the proportions stated or other proportions.

What we claim, and desire to secure by Letters Patent of the United States, is—

The herein-described composition of matter to be used for preserving fresh fish and meat, consisting of pure water, albumen or gelatine, potassium sulphate, sodium chloride, boracic acid or borate of sodium, sodium phosphate, phosphate of iron, and phosphate of calcium, in the proportions substantially as set forth.

LOUIS BENUSSI.
CHARLES DONDERO.

Witnesses:
GEO. W. REED,
J. S. BLEY.